US009138735B2

(12) United States Patent
Roberts et al.

(10) Patent No.: US 9,138,735 B2
(45) Date of Patent: Sep. 22, 2015

(54) METHOD OF COATING A SUBSTRATE WITH A CATALYST COMPONENT

(71) Applicant: Johnson Matthey Public Limited Company, London (GB)

(72) Inventors: Dale Albert Roberts, Richboro, PA (US); Andrew Michael Bortz, Conshohocken, PA (US); Daniel L. Troland, Conshohocken, PA (US); Richard Peter Rose, Meldreth (GB); R. Bradford Fortner, Royersford, PA (US)

(73) Assignee: Johnson Matthey Public Limited Company, London (GB)

( * ) Notice: Subject to any disclaimer, the term of this patent is extended or adjusted under 35 U.S.C. 154(b) by 4 days.

(21) Appl. No.: 14/294,190

(22) Filed: Jun. 3, 2014

(65) Prior Publication Data

US 2014/0356530 A1 Dec. 4, 2014

Related U.S. Application Data

(60) Provisional application No. 61/830,233, filed on Jun. 3, 2013.

(30) Foreign Application Priority Data

Jun. 28, 2013 (GB) .................................. 1311615.7

(51) Int. Cl.
*B01J 37/02* (2006.01)
*B01D 53/94* (2006.01)
(Continued)

(52) U.S. Cl.
CPC .......... *B01J 37/0215* (2013.01); *B01J 37/0234* (2013.01); *B05C 7/02* (2013.01); *B05C 7/04* (2013.01); *B05C 11/02* (2013.01);
(Continued)

(58) Field of Classification Search
None
See application file for complete search history.

(56) References Cited

U.S. PATENT DOCUMENTS 2,639,052 A 5/1953 Gebauer et al.
3,948,213 A * 4/1976 Hoyer et al. .................... 118/50
(Continued)

FOREIGN PATENT DOCUMENTS

CN 1461672 A 12/2003
DE 102009009579 A1 9/2010
(Continued)

OTHER PUBLICATIONS

Ogyu, et al., "Improving of the Filtration and Regeneration Performance by the Sic-DPF with the Layer Coating of PM Oxidation Catalyst," SAE Paper No. 2008-01-0621, Copyright 2008 SAE International, pp. 1-6.

*Primary Examiner* — William Phillip Fletcher, III
(74) *Attorney, Agent, or Firm* — Kevin M. Carroll

(57) ABSTRACT

A method of coating a substrate with a liquid comprising a catalyst component, the method comprising:
(a) holding the substrate vertically, thereby defining upper and lower ends thereof, wherein the vertical substrate comprises a plurality of channels that are open at said upper and lower ends;
(b) continuously introducing the liquid into the substrate by pushing or injecting the liquid through the open ends of the channels at the lower end of the substrate with a piston; and
(c) after the lower end of the substrate has been partly filled with the liquid in step (b), applying a vacuum to the open ends of the channels at the upper end of the substrate while continuing to introduce the liquid into the substrate.

14 Claims, 3 Drawing Sheets

(51) Int. Cl.
  B05D 7/22 (2006.01)
  B05D 7/24 (2006.01)
  F01N 3/20 (2006.01)
  B05C 7/04 (2006.01)
  B05C 7/02 (2006.01)
  B05C 11/02 (2006.01)
  B05D 3/02 (2006.01)
  B05D 3/04 (2006.01)
  B65D 6/10 (2006.01)

(52) U.S. Cl.
  CPC ........... B05D 3/0245 (2013.01); *B05D 3/0493* (2013.01); *B05D 2254/04* (2013.01); *B65D 7/22* (2013.01)

(56) References Cited

U.S. PATENT DOCUMENTS

| | | | |
|---|---|---|---|
| 4,142,864 A | 3/1979 | Rosynsky et al. | |
| 4,171,288 A | 10/1979 | Keith et al. | |
| 4,191,126 A * | 3/1980 | Reed et al. | 118/50 |
| 4,208,454 A * | 6/1980 | Reed et al. | 427/238 |
| 4,550,034 A * | 10/1985 | Shimrock et al. | 427/243 |
| 4,609,563 A * | 9/1986 | Shimrock et al. | 427/8 |
| 5,422,138 A * | 6/1995 | Watanabe et al. | 427/230 |
| 5,516,494 A * | 5/1996 | Domesle et al. | 427/243 |
| 5,866,210 A * | 2/1999 | Rosynsky et al. | 427/294 |
| 5,953,832 A * | 9/1999 | Rosynsky et al. | 34/403 |
| 6,127,300 A | 10/2000 | Kharas et al. | |
| 6,478,874 B1 * | 11/2002 | Rosynsky et al. | 118/63 |
| 6,599,570 B1 * | 7/2003 | Aderhold et al. | 427/238 |
| 6,627,257 B1 * | 9/2003 | Foerster et al. | 427/235 |
| 7,374,792 B2 * | 5/2008 | Rosynsky et al. | 427/231 |
| 7,476,417 B2 * | 1/2009 | Dettling et al. | 427/238 |
| 7,521,087 B2 * | 4/2009 | Rosynsky et al. | 427/231 |
| 7,678,416 B2 * | 3/2010 | Suzuki et al. | 427/230 |
| 8,574,670 B2 * | 11/2013 | Liu et al. | 427/230 |
| 8,703,236 B2 * | 4/2014 | Chandler et al. | 427/238 |
| 8,794,611 B2 * | 8/2014 | Schmitz | 269/56 |
| 8,834,972 B2 * | 9/2014 | Hasselmann | 427/408 |
| 8,889,221 B2 * | 11/2014 | Sappok et al. | 427/237 |
| 2001/0026838 A1 * | 10/2001 | Dettling et al. | 427/230 |
| 2003/0003232 A1 | 1/2003 | Rosynsky et al. | |
| 2003/0072694 A1 | 4/2003 | Hodgson et al. | |
| 2005/0031514 A1 | 2/2005 | Patchett et al. | |
| 2007/0116870 A1 | 5/2007 | Dettling et al. | |
| 2008/0145531 A1 * | 6/2008 | Rosynsky et al. | 427/231 |
| 2008/0200328 A1 * | 8/2008 | Eberle et al. | 502/100 |
| 2009/0193796 A1 | 8/2009 | Wei et al. | |
| 2012/0321537 A1 * | 12/2012 | Mergner et al. | 423/212 |
| 2014/0363578 A1 | 12/2014 | Han et al. | |

FOREIGN PATENT DOCUMENTS

| | | | |
|---|---|---|---|
| EP | 1325781 | A1 | 9/2003 |
| EP | 1850068 | A1 | 10/2007 |
| EP | 2158956 | A1 | 3/2010 |
| EP | 1057519 | B2 | 8/2011 |
| KR | 1020130034688 | * | 6/2013 |
| WO | 9947260 | A1 | 9/1999 |
| WO | 0001463 | | 1/2000 |
| WO | 0180978 | A1 | 11/2001 |
| WO | 2004079167 | A1 | 9/2004 |
| WO | 2005016497 | A1 | 2/2005 |
| WO | 2010006274 | A1 | 1/2010 |
| WO | 2010114873 | A2 | 10/2010 |
| WO | 2011080525 | A1 | 7/2011 |

* cited by examiner ns. The method of the invention also allows excellent profile control and control over the dose length.

The method and apparatus can be used to apply liquids having a wide range of viscosities. Normally, methods in the prior art for coating a substrate only give good results when used with a liquid having a viscosity within a specific range, which is usually a narrow viscosity range (this is often referred to as the "washcoat processing window"). As a result, it may be necessary to modify the formulation of a washcoat for use in a particular method so that it will have a viscosity that falls within the "washcoat processing window" for that method. The method and apparatus can provide good results over a wide washcoat processing window. It allows washcoats having a wide range of viscosities to be coated onto substrates without modification of the washcoat formulation.

The invention provides a method of coating a substrate with a liquid comprising a catalyst component, which substrate comprises a plurality of channels, wherein the method comprises:
  (a) holding the substrate vertically;
  (b) introducing the liquid into the substrate via or through the open ends of the channels at a lower end of the substrate; and
  (c) after or when the lower end of the substrate has been part-filled with the liquid, applying a vacuum to the open ends of the channels at the upper end of the substrate while introducing the liquid into the substrate.

The invention also provides an apparatus for performing the method. An aspect of the invention relates to an apparatus for coating a substrate with a liquid comprising a catalyst component, which substrate comprises a plurality of channels, wherein the apparatus comprises:
  (a) means for holding the substrate vertically;
  (b) means for introducing the liquid into the substrate via or through the open ends of the channels at a lower end of the substrate;
  (c) means for triggering a vacuum when the lower end of the substrate has been part-filled with the liquid; and
  (d) means for applying a vacuum to the open ends of the channels at the upper end of the substrate.

A further aspect of the invention relates to the use of the apparatus for coating a substrate with a liquid comprising a catalyst component.

METHOD OF COATING A SUBSTRATE WITH A CATALYST COMPONENT

CROSS REFERENCE TO RELATED APPLICATIONS

This application claims priority benefit to U.S. Provisional Patent Application No. 61/830,233 filed on Jun. 3, 2013, and to Great Britain Patent Application No. 1311615.7 filed on Jun. 28, 2013, all of which are incorporated herein by reference.

FIELD OF THE INVENTION

The invention relates to a method of coating a substrate with a liquid comprising a catalyst component. The coated substrate is for use in an emissions control device for treating or removing pollutants from an exhaust gas produced by an internal combustion engine. The invention further relates to an apparatus for coating a substrate with a liquid comprising a catalyst component.

BACKGROUND TO THE INVENTION

Emissions control devices (e.g. catalysts, such as three-way catalysts or diesel oxidation catalysts) for treating the exhaust gas of an internal combustion engine in both mobile and stationary applications typically include a substrate (e.g. a honeycomb monolith substrate) coated with a liquid that comprises a catalyst component. Problems can arise during the coating process that can depend on the properties of the substrate that is to be coated (e.g. size of the channels, the material from which the substrate is made and its porosity) and the properties (e.g. rheology) of the liquid that is used to form the coating. Various methods and apparatus have been developed by manufacturers of emissions control devices to address these problems.

WO 99/47260 describes a method of coating a monolithic support comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support.

WO 2011/080525 describes a method of coating a honeycomb monolith substrate comprising a plurality of channels with a liquid comprising a catalyst component, which method comprises the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

SUMMARY OF THE INVENTION

The inventors have developed a method and apparatus for automatedly and accurately coating substrates with a liquid comprising a catalyst component. In particular, the method and apparatus can uniformly coat the walls of the channels of a substrate with the liquid to a pre-determined length with minimal variation between the coating lengths of the chan-

DETAILED DESCRIPTION OF THE INVENTION

Figure 1:
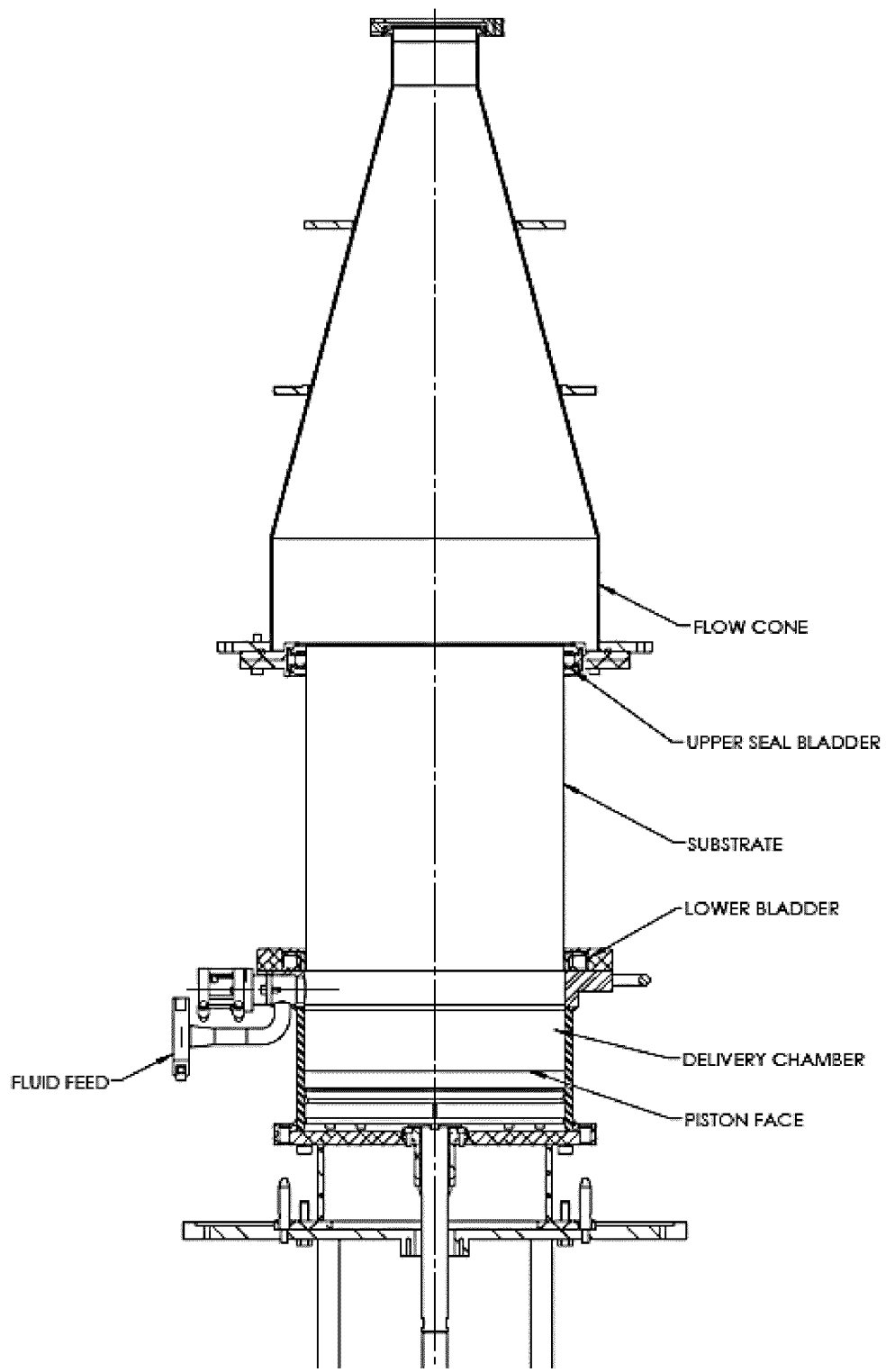
FIG. 1 shows a cross-section of an apparatus for use in performing the method of the invention.

Emissions control devices for treating or removing pollutants in an exhaust gas produced by a combustion engine are well known in the art. Such devices typically comprise a substrate coated with a catalyst component. The invention is for use in preparing such devices.

The invention relates to coating a substrate with a liquid comprising a catalyst component. It is to be understood that the "catalyst component" is not limited to being a chemical compound or material that is catalytically active in a reaction involving a pollutant component of an exhaust (e.g. CO, HC or $NO_x$). The term "catalyst component" embraces any component that is normally applied in washcoat for inclusion in a catalyst or emissions control device. For example, the catalyst component can refer to a material that is able to store or absorb $NO_x$ or hydrocarbon. However, it is preferred that the "catalyst component" is itself catalytically active.

Liquids comprising a catalyst component are known to those skilled in the art and include: aqueous solutions of platinum group metal compounds, such as platinum, palladium and rhodium compounds, aqueous solutions of alkali metal and alkaline earth metal compounds for depositing compounds for absorbing $NO_x$ on the substrates, and other components such as compounds of transition metals e.g. iron, copper, vanadium, cerium and transition metal catalyst promoter compounds; washcoat slurries including particulate catalyst support materials such as alumina, ceria, titania, zirconia, silica-alumina and zeolites, optionally supporting one or more of the above mentioned platinum group metals or transition metals; and washcoat slurries containing combinations of supported metal compounds and aqueous solutions of the above mentioned metal compounds. Such liquids can also include relevant acids, organic compound thickeners etc. to improve the catalyst activity, chemistry of the formulation to suit the intended purpose of the resulting catalyst, and/or the viscosity and rheology of the liquid. The liquid may be a solution or a suspension, but commonly the liquid is a suspension.

Using the invention it has been possible to successfully coat substrates with liquids (e.g. washcoats) having viscosities from around 100 cP up to above 1000 cP (as measured at 20° C. on a Brookfield RV DVII+ Extra Pro viscometer using a SC4-27 spindle at 50 rpm spindle speed).

The method and apparatus of the invention may be used to coat a substrate with the liquid over only part of the length of the channels (i.e. less than the axial length of the channels).

In practice, the method of the invention is typically performed repeatedly, such as by using an automated apparatus, like the apparatus of the invention.

Typically, step (a) of the method comprises holding the substrate vertically using or with a means for holding the substrate. In the method or apparatus of the invention, the "means for holding the substrate" may also be referred to as a "substrate holder". In general, step (a) of the method comprises holding the substrate substantially vertically. The apparatus of the invention generally comprises a means for holding the substrate substantially vertically.

The means for holding the substrate may support an exterior surface, such as an exterior surface of an end or a side of the substrate (i.e. when the substrate is orientated such that the open ends of the channels are at a lower end and/or an upper end). It is preferred that the means for holding the substrate supports an exterior surface of a side of the substrate.

Typically, the means for holding the substrate comprises a housing for receiving a lower end of the substrate. Not all substrates have a conventional circular cross-section, and some may have an oval or "race-track", skewed oval or other asymmetric cross-section. Whatever the cross-section of the substrate, it is possible to adopt a suitably shaped housing for receiving the substrate using conventional methods or techniques.

The substrate can be manually or automatically inserted into the means for holding the substrate (e.g. the substrate holder). It is preferred that the substrate is automatically inserted into the means for holding the substrate. The apparatus of the invention may comprise a "pick-and-place" device (e.g. a robotic "pick-and-place" device) for inserting (e.g. automatically inserting) the substrate into the means for holding the substrate.

In the method of the invention, step (a) may comprise (a1) picking up a substrate (e.g. with a "pick-and-place" device) and (a3) holding the substrate vertically (e.g. with a means for holding the substrate or a substrate holder). It is preferred that step (a) comprises (a1) picking up a substrate, (a2) inserting the substrate into a means for holding the substrate, and then (a3) holding the substrate vertically with the means for holding the substrate. More preferably, step (a) comprises (a1) picking up a substrate, (a2) inserting the substrate into a housing for receiving a lower end of the substrate, and then (a3) holding the substrate vertically with the means for holding the substrate, such as an inflatable collar.

Generally, the means for holding the substrate comprises at least one inflatable collar for contacting and/or engaging with an exterior surface of the substrate. Each inflatable collar may form a liquid or air tight seal around the substrate. In the method of the invention, step (a) may comprise (a) holding the substrate vertically by inflating an inflatable collar around the lower end of the substrate.

It is preferred that the means for holding the substrate comprises only one inflatable collar or at least two inflatable collars (more preferably only two inflatable collars), wherein each collar is for contacting and/or engaging with an exterior surface of the substrate. Each inflatable collar may be conformable with an exterior surface of the substrate.

It is preferred that at least one inflatable collar (e.g. the first inflatable collar) is supported by the housing (e.g. supported by an internal wall of the housing) and, preferably, extends into an interior space of the housing.

In general, each inflatable collar may be arranged to contact and/or engage with the exterior surface of the substrate in a horizontal plane (i.e. the plane perpendicular to an axial length or central axis of the substrate, such as a plane parallel to a plane containing an end of the substrate through which the exhaust gas is to be passed). Each inflatable collar may be arranged to contact and/or engage with part of or to completely surround the exterior surface of the substrate in the horizontal plane (e.g. an exterior surface of a side of the substrate). For example, when the substrate has a circular cross-section, then each inflatable collar may be arranged to contact and/or engage with an arcuate portion or an entire circumference of the exterior surface of the substrate in the horizontal plane. It is preferred that each inflatable collar is arranged to contact and/or engage with an entire circumferential length of an exterior surface of the substrate.

The means for holding the substrate typically comprises a first inflatable collar for contacting and/or engaging with an exterior surface at a lower end of the substrate and a second inflatable collar for contacting and/or engaging with the exterior surface of the substrate above the lower end of the substrate (e.g. at about midway between the lower and upper ends of the substrate or in an upper half of the substrate). The means for applying a vacuum to the upper end of the substrate may provide part of the means for holding the substrate when the means for applying a vacuum comprises an inflatable collar, such as the second inflatable collar.

The first inflatable collar holds the substrate in position while liquid is introduced into the lower end of the substrate. It also provides a barrier that prevents the liquid from coating an exterior surface at a side of the substrate. When the liquid passes the inflatable collar and coats an exterior surface at a side of the substrate, then some of the liquid will not be introduced into the inside of the substrate resulting in a reduction of the coating precision of the method, particularly when the substrate has a relatively small volume.

Typically, the first inflatable collar, when inflated, has a surface that provides a continuous, flat surface or barrier with the end (e.g. end face) of the substrate. An example of such an inflatable collar is an inflatable collar having a square or rectangular cross section. Thus, when inflated the first inflatable collar and the end face of the substrate form a single flat surface, such that there are no spaces between the inflatable collar and an exterior surface at a side of the substrate for the liquid to accumulate or collect.

It is preferred that the or each inflatable collar has a square or rectangular cross section. When there is a first inflatable collar and a second inflatable collar, then it is preferred that the first inflatable collar and the second inflatable collar each has a square or rectangular cross section. Such an inflatable collar may also be known as a square faced bladder. One of the flat sides of the inflatable collar has a surface that conforms with an exterior surface at a side of the substrate. Another of the flat sides of the inflatable collar has a surface that can form a continuous flat surface with the end of the substrate. The square faced bladder can also deflate more evenly than inflatable collars having other shapes, leaving more space between the substrate and the bladder thereby allowing improved airflow when a vacuum is applied to the substrate.

The method comprises (b) introducing the liquid into the substrate through open ends of the channels at a lower end of the substrate. This is a step of applying the liquid to the interior of the substrate. The liquid is introduced against gravity into the substrate through the open ends of the channels at a lower end of the substrate, such as by pushing or injecting the liquid into the substrate. It has been found that introducing the liquid into the substrate against gravity assists in providing a wider washcoat processing window. The liquid can be uniformly coated onto the walls of the channels to a pre-determined length, where the difference between the coating lengths of the channels is 5 mm or less, typically 2 mm or less (e.g. 1 mm or less).

Typically, step (b) of the method comprises (b) introducing the liquid into the substrate through the open ends of the channels at a lower end of the substrate using or with means for introducing the liquid into the substrate. The means for introducing the liquid into the substrate may also be referred to as a liquid introducer.

In general, step (b) of the method comprises mechanically introducing the liquid into the substrate through the open ends of the channels at the lower end of the substrate. It is preferred that step (b) comprises introducing the liquid into the substrate by pushing or injecting the liquid through the open ends of the channels at the lower end of the substrate. Thus, in the apparatus of the invention the means for introducing the liquid into the substrate is, or comprises, means for pushing or injecting the liquid into the substrate.

In principle the means for applying a vacuum could be used as a means for introducing the liquid into the substrate. Typically, the means for introducing the liquid into the substrate does not consist of a means for applying a vacuum (i.e. the means for applying a vacuum is not the only means for introducing the liquid into the substrate), particularly the means for applying a vacuum to the open ends of the channels at an upper end of the substrate.

It is preferred that the means for introducing the liquid into the substrate comprises means for mechanically introducing (e.g. by pushing and/or injecting) the liquid into the substrate. The means for introducing the liquid into the substrate may additionally comprise means for applying a vacuum, such as the means for applying a vacuum to the open ends of the channels at an upper end of the substrate.

The liquid may be introduced into the substrate in a step-wise or a continuous manner (e.g. without pausing).

Step (b) of the method may comprise step-wisely introducing the liquid into the substrate through the open ends of the channels at the lower end of the substrate. In a step-wise method, steps (b) and (c) of the method may comprise the following steps: (b) introducing the liquid into the substrate (e.g. by pushing or injecting the liquid) through the open ends of the channels at a lower end of the substrate until the lower end of the substrate is part-filled with the liquid; (c1) pausing or stopping the introduction of the liquid (e.g. by pushing or injecting the liquid) into the substrate and then applying a vacuum to the open ends of the channels at an upper end of the substrate; and (c2) introducing the liquid into the substrate (e.g. by pushing or injecting the liquid) through open ends of the channels at the lower end of the substrate while applying the vacuum.

When there is a pause between introducing the liquid into a lower end of the substrate and applying a vacuum, it has been found that a line or region (sometimes called a "band") can form within the substrate when the liquid is stationary. This line or band can form if there is a pause between applying a vacuum to the upper end of the substrate after completely introducing the liquid through the lower end of the substrate. Typically, the line or band has a higher concentration of the liquid than the rest of the substrate that has already been coated. As a result, each of the coated channels of the substrate will not contain a uniform distribution of the liquid along their axial length. This can affect the catalytic performance of the coated substrate and/or may cause or contribute to excessive back pressure during use.

The liquid can be continuously introduced into the substrate. It is preferred that the liquid is continuously introduced into the substrate, typically until the substrate has been coated with a dose (i.e. a single dose) of the liquid. The step of introducing the liquid into the substrate through the open ends of the channels at a lower end of the substrate is a single step of introducing the liquid and typically is continued until the substrate has been coated with a dose of the liquid (e.g. an amount of liquid that will meet a desired product specification, typically for the emissions control device). An advantage of continuously introducing the liquid into the substrate is that it avoids the formation of a line or a region of excess liquid within the channels that occurs when the liquid is stationary.

In the method it is preferred that step (b) is a step of (b) continuously introducing the liquid into the substrate (e.g. by pushing the liquid) through the open ends of the channels at a lower end of the substrate. Step (b) typically comprises continuously introducing the liquid into the substrate (e.g. by pushing the liquid) through the open ends of the channels at a lower end of the substrate until all or substantially all (e.g. all or substantially all of the pre-determined amount) is introduced into the substrate.

The means for introducing the liquid into the substrate may be a means for continuously introducing (e.g. by pushing or injecting) the liquid into the substrate or may be a means for pushing or injecting the liquid step-wise into the substrate. It is preferred that the means for introducing the liquid into the substrate is a means for continuously introducing the liquid into the substrate.

Typically, method step (b) comprises introducing, preferably continuously introducing, a pre-determined amount of the liquid into the substrate through the open ends of the channels at a lower end of the substrate. This step is generally carried out using or with the means for introducing the liquid into the substrate. The means for introducing the liquid into the substrate is preferably a means for introducing a pre-determined amount of the liquid into the substrate.

The pre-determined amount may be a pre-determined volume and/or a pre-determined mass of the liquid. It is preferred that the pre-determined amount is a pre-determined volume.

The pre-determined amount is typically a single dose of the liquid.

The means for introducing the liquid (i.e. the means for pushing or injecting the liquid) into the substrate typically comprises a piston. The piston is used to rapidly push or inject the liquid up into the substrate.

In general the piston is within a housing. It is preferred that the piston is a reciprocating piston within a housing. It is preferred that the housing has a delivery chamber. Typically, the delivery chamber is below the lower end of the substrate, when the substrate is inserted.

The delivery chamber typically has a displacement volume. The delivery chamber is preferably a cylinder. Although the term "cylinder" implies a circular cross-section of a piston head and cylinder bore, the shape of the piston head and cylinder bore may be dictated by the cross-sectional shape of the substrate. For example, when the substrate is oval in cross-section, then the piston head and cylinder bore are also oval in cross-section. This is because matching the cross-section of piston head and cylinder bore with the substrate can promote coating of the substrate to a more even axial depth. However, it is not essential to match the cross-section of the substrate with the cross-section of the piston head and cylinder bore as this avoids re-tooling the apparatus for coating substrates of differing cross-sections. It is preferred that the piston head and cylinder have a circular cross-section.

The use of a piston arrangement avoids many of the problems associated with using other means for introducing the liquid, such as an immersion vessel where separation and sedimentation of the liquid can occur within the vessel.

Step (b) of the method typically comprises (b) introducing the liquid into the substrate through the open ends of the channels at a lower end of the substrate with a piston, preferably a reciprocating piston. It is preferred that step (b) comprises introducing the liquid, particularly a pre-determined amount of the liquid, into the substrate by pushing or injecting the liquid through the open ends of the channels at a lower end of the substrate with a piston. More preferably step (b) comprises continuously introducing the liquid, particularly a pre-determined amount of the liquid, into the substrate by pushing or injecting the liquid through the open ends of the channels at a lower end of the substrate with a piston.

Generally, the piston reciprocates within the housing between (i) a first position where the piston is retracted and (ii) a second position where the piston, preferably a surface of the piston (i.e. the piston face), abuts a lower end of the substrate and/or abuts or aligns with a cylinder head.

Step (b) of the method preferably comprises pushing or injecting the liquid into the substrate through the open ends of the channels at a lower end of the substrate with a reciprocating piston, where the reciprocating piston pushes or injects the liquid into the substrate as it moves from (i) a first position, where the piston is retracted, to (ii) a second position, where the piston (i.e. the piston face) abuts a lower end of the substrate and/or abuts or aligns with a cylinder head.

In the first position the piston is retracted. The retracted piston within the housing defines a delivery chamber having a displacement volume (e.g. the displacement volume is defined by an internal wall of the cylinder, cylinder head and piston head). Typically, the displacement volume is greater than or equal to the volume of the liquid to be introduced into the substrate. It is preferred that the displacement volume is similar to, or the same as, the pre-determined volume (i.e. the total volume) of liquid to be introduced into the substrate. The displacement volume can be equal to, or substantially the same as, a single dose of the liquid for coating the (i.e. a single) substrate. This is so that little or no dead space exists when the displacement volume is charged with the liquid.

Generally all or substantially all of the liquid in the delivery chamber is introduced into the substrate, such as when the reciprocating piston moves from the first position to the second position. The delivery chamber (e.g. cylinder bore) is typically emptied when the entire volume of the liquid is introduced into the substrate, and the piston (e.g. piston head) abuts the lower end of the substrate.

In the second position, the piston may abut (e.g. come into contact with) the lower end of the substrate.

The piston may be in the second position when the substrate is inserted into the means for holding the substrate (e.g. substrate holder), such as when step (a2) of the method is performed. In the second position, the substrate can be supported by the piston to ensure that a reliable or secure engagement is provided between the substrate and the means for holding the substrate.

Step (a2) of the method may comprise (a2) placing the substrate onto a piston (e.g. the piston in the second position), preferably a reciprocating piston, within a housing for receiving a lower end of the substrate. Step (a) of the method preferably comprises (a2) placing the substrate onto a reciprocating piston in a second position within a housing for receiving a lower end of the substrate, (a3) holding the substrate vertically by inflating an inflatable collar around the lower end of the substrate, and then (a4) retracting the piston within the housing to a first position, preferably wherein the first position defines a delivery chamber having a displacement volume. In this embodiment, step (b1) is typically performed after step (a2), and preferably after step (a4).

Alternatively, the piston may be in the first position when the substrate is inserted into the means for holding the substrate, such as when step (a2) of the method is performed. Step (a2) may comprise (a2) inserting the substrate into a housing for receiving a lower end of the substrate when a piston within the housing, preferably a reciprocating piston within the housing, is in a first position (e.g. where the piston is retracted). Step (a) of the method may comprise (a2) inserting the substrate into a housing for receiving a lower end of the substrate when a piston within the housing, preferably a reciprocating piston within the housing, is in a first position (e.g. where the piston is retracted), and then (a3) holding the substrate vertically by inflating an inflatable collar around the lower end of the substrate. In this embodiment, step (b1) may occur before, after or concurrently with any one of steps (a1), (a2) or (a3), provided that the piston is in the first position.

Generally, the piston has a piston face that comprises a flexible, non-porous, hydrophobic material, such as a polymer. The piston face typically comprises, or consists of, a polymer which is a polyester. The polyester preferably comprises, or consists of, polyethylene terephthalate. The polymer should be chemically inert to the components of the liquid, it should be machinable to provide a flat and smooth surface, and it should have fine grain structures that do not retain liquid.

Step (b) of the method may comprise (b1) dispensing a pre-determined amount of the liquid (e.g. using or with a means for dispensing a pre-determined amount of the liquid) and (b2) introducing the pre-determined amount of the liquid into the substrate through the open ends of the channels at a lower end of the substrate (e.g. using or with the means for introducing the liquid into the substrate). The step (b1) may further comprise (b1) dispensing a pre-determined amount of the liquid (e.g. using or with a means for dispensing a pre-determined amount of the liquid) into the means for introducing the liquid into the substrate. It is preferred that step (b1) comprises dispensing a pre-determined amount of the liquid (e.g. using or with a means for dispensing a pre-determined amount of the liquid) into the delivery chamber (i.e. when the piston is in the first position).

The step of (b1) dispensing a pre-determined amount of the liquid precedes the step of (b2) introducing the pre-determined amount of the liquid into the substrate through the open ends of the channels at a lower end of the substrate. When the method of the invention comprises any of steps (a1) and (a3), steps (a2) and (a3), steps (a1) to (a3), steps (a2) to (a4) or steps (a1) to (a4) as described above, then step (b2) generally follows these steps.

The apparatus may further comprise a means for dispensing a pre-determined amount of the liquid, such as described below. The "means for dispensing a pre-determined amount of the liquid" may also be referred to as a "liquid dispenser".

Typically, the means for dispensing a pre-determined amount of the liquid comprises a valve. The valve may be present in a wall of a housing of the means for introducing the liquid into the substrate. When the means for introducing the liquid into the substrate comprises a piston that reciprocates within a housing, then the valve may be in a wall of the housing (e.g. the cylinder wall).

The valve may be used to dispense a pre-determined volume of the liquid, such as into the delivery chamber. Additionally or alternatively, the valve may be used to control the flow of the liquid into a weighing means or into the means for introducing the liquid into the substrate.

When the means for introducing the liquid into the substrate comprises a piston that reciprocates within a housing, such as a cylinder, then the means for dispensing a pre-determined amount of the liquid comprises, or consists of, (i) an aperture in a cylinder head, (ii) a valve in a wall of the piston housing or cylinder, and/or (iii) a conduit in the piston rod and piston head. It is preferred that the means for dispensing a pre-determined amount of the liquid comprises, or consists of, a valve means in a wall of the piston housing or cylinder.

In general, step (b) of the method comprises (b2') introducing the liquid into the substrate through the open ends of the channels at a lower end of the substrate until the lower end of the substrate is part-filled (i.e. part-coated) with the liquid and (b2'') introducing the liquid into the substrate through the open ends of the channels, preferably until a pre-determined amount of the liquid has been introduced into (i.e. applied to the interior of) the substrate.

Step (b2') of the method typically comprises, or consists of, introducing the liquid into the substrate through the open ends of the channels at the lower end of the substrate without applying a vacuum to the open ends of the channels at the upper end of the substrate until the lower end of the substrate is part-filled (i.e. part-coated) with the liquid. It is preferred that step (b2') comprises, or consists of, mechanically introducing the liquid into the substrate through the open ends of the channels at the lower end of the substrate without applying a vacuum to the open ends of the channels at the upper end of the substrate until the lower end of the substrate is part-filled (i.e. part-coated) with the liquid. More preferably, step (b2') comprises, or consists of, introducing the liquid into the substrate by pushing or injecting the liquid through the open ends of the channels at the lower end of the substrate without applying a vacuum to the open ends of the channels at the upper end of the substrate, until the lower end of the substrate is part-filled (i.e. part-coated) with the liquid. It is further preferred that step (b2') comprises, or consists of, introducing the liquid into the substrate by pushing or injecting the liquid through the open ends of the channels at the lower end of the substrate with a piston, without applying a vacuum to the open ends of the channels at the upper end of the substrate, until the lower end of the substrate is part-filled (i.e. part-coated) with the liquid.

Alternatively, step (b2') typically comprises, or consists of, introducing the liquid into the substrate by mechanically introducing the liquid through the open ends of the channels at the lower end of the substrate, and optionally by applying a vacuum to the open ends of the channels at the upper end of the substrate, until the lower end of the substrate is part-filled (i.e. part-coated) with the liquid. More preferably, step (b2') comprises, or consists of, introducing the liquid into the substrate by pushing or injecting the liquid through the open ends of the channels at the lower end of the substrate, and optionally by applying a vacuum to the open ends of the channels at an upper end of the substrate, until the lower end of the substrate is part-filled (i.e. part-coated) with the liquid. It is further preferred that step (b2') comprises, or consists of, introducing the liquid into the substrate by pushing or injecting the liquid through the open ends of the channels at the lower end of the substrate with a piston, and optionally by applying a vacuum to the open ends of the channels at an upper end of the substrate, until the lower end of the substrate is part-filled (i.e. part-coated) with the liquid.

It is generally preferred that step (b2') is performed without applying a vacuum to the open ends of the channels at the upper end of the substrate.

Typically, step (b2'') comprises mechanically introducing the liquid into the substrate through the open ends of the channels at a lower end of the substrate, preferably until a pre-determined amount of the liquid has been introduced into (i.e. applied to the interior of) the substrate. It is preferred that step (b2'') comprises, or consists of, introducing the liquid into the substrate by pushing or injecting the liquid through the open ends of the channels at a lower end of the substrate, preferably until a pre-determined amount of the liquid has been introduced into (i.e. applied to the interior of) the substrate. It is further preferred that step (b2'') comprises, or consists of, introducing the liquid into the substrate by pushing or injecting the liquid through the open ends of the channels at a lower end of the substrate with a piston, preferably until a pre-determined amount of the liquid has been introduced into (i.e. applied to the interior of) the substrate. It is to be appreciated that step (b2'') is performed when the substrate is under a vacuum.

As explained above, the introduction of the liquid into the substrate may be carried out using a step-wise method. For example, in the step-wise method above, step (b) may comprise, or consist of, step (b2'), and step (c2) may comprise, or consist of, step (b2'').

Typically, step (b2'') immediately follows (i.e. without pause) step (b2'). Steps (b2') and (b2'') are preferably steps of continuously introducing the liquid into the substrate (i.e. without pause) through the open ends of the channels, more preferably until a pre-determined amount of the liquid has been introduced into (i.e. applied to the interior of) the substrate.

Generally, the lower end of the substrate is part-filled with the liquid when the substrate is filled up to at least 1% of the axial length of the substrate (e.g. from the lower end), such as at least 2% of the axial length, preferably at least 5% of the axial length (e.g. at least 10%), more preferably at least 25% of the axial length.

Alternatively or additionally, the lower end of the substrate is typically part-filled with the liquid when the substrate is filled with 5 to 95% of the pre-determined amount (e.g. from the lower end), such as 10 to 90% (e.g. 25 to 75%) of the pre-determined amount, particularly at least 35 to 55% of the pre-determined amount. It is preferred that the lower end of the substrate is part-filled with the liquid when the substrate is filled with 55 to 95% of the pre-determined amount, more preferably 75 to 90% of the pre-determined amount.

The apparatus of the invention comprises means for triggering a vacuum (e.g. the means for applying a vacuum) when the lower end of the substrate has been part-filled with the liquid.

Typically, the means for triggering the vacuum is electrically coupled to the means for applying a vacuum to the open ends of the channels at the upper end of the substrate.

The means for triggering the vacuum may comprise means for determining that a lower end of the substrate has been part-filled. The means for determining that a lower end of the substrate has been part-filled may comprise, or consist of, a weighing means (e.g. for measuring the mass of liquid introduced into the substrate) and/or a volume measuring means. It is preferred that the means for determining that a lower end of the substrate has been part-filled comprises, or consists of, a volume measuring means.

The volume measuring means may be a means of determining a displacement volume of the liquid to part-fill the substrate from the means for introducing the liquid into the substrate through open ends of the channels at the lower end of the substrate. When the means for introducing the liquid into the substrate comprises a piston that reciprocates within a housing, such as a cylinder, then the volume measuring means may trigger the vacuum when the piston is in a pre-determined position, such as a first, intermediate position of the piston. The first, intermediate position of the piston is between the first position and the second position of the piston and typically defines a displacement volume when the lower end of the substrate is part-filled with the liquid. The volume measuring means may be a servo motor, such as a servo motor coupled to a sensor for position feedback of the piston.

Additionally or alternatively, the volume measuring means may allow in situ determination of a fill level of the liquid within the substrate (e.g. the volume measuring means may comprise, or consist of, a spectroscopic measuring means).

Typically, the means for triggering the vacuum when the lower end of the substrate has been part-filled with the liquid comprises, or consists of, a timer. The timer may be a computer. The timer may be used to measure a part-fill time period. The part-fill time period may define a displacement volume of the liquid to part-fill the substrate from the means for introducing the liquid into the substrate (e.g. through the open ends of the channels at a lower end of the substrate). When the means for introducing the liquid comprises a piston that reciprocates within a housing, such as a cylinder, then the part-fill time period may represent the period of time for the piston to move from the second position to the first, intermediate position. Additionally or alternatively, the timer may be used to measure the duration for applying the vacuum to the open ends of the channels at the upper end of the substrate.

The timer may be electrically coupled to the means for applying a vacuum to the open ends of the channels at the upper end of the substrate and optionally electrically coupled to the means for introducing the liquid into the substrate (e.g. through the open ends of the channels at the lower end of the substrate). It is preferred that the timer is electrically coupled to the means for introducing the liquid into the substrate and to the means for applying a vacuum to the open ends of the channels at the upper end of the substrate.

The method of the invention comprises the step (c) after or when a lower end of the substrate has been part-filled with the liquid, applying a vacuum to the open ends of the channels at the upper end of the substrate while introducing the liquid into the substrate in step (b), (b2) or (b2"), preferably until all or substantially all (e.g. all or substantially all of the pre-determined amount) has been introduced into (i.e. applied to the interior of) the substrate. In general, step (c) involves introducing the liquid into the substrate while the substrate is continuously below atmospheric pressure.

Typically, step (c) may comprise, after a lower end of the substrate has been part-filled with the liquid, applying a vacuum using, or with, a means for applying a vacuum, while introducing the liquid.

After or when the lower end of the substrate has been part-filled with the liquid, the vacuum may be applied to the open ends of the channels at an upper end of the substrate in a step-wise or a continuous manner (i.e. without pausing). When the vacuum is applied in a step-wise manner, the liquid can be introduced into the substrate under a static vacuum to maintain a pressure below atmospheric pressure within the substrate. It may be necessary to regenerate the vacuum after introduction of some of the liquid. The strength of the vacuum applied during the step-wise application may be the same or different each time. When the vacuum is applied continuously, then the liquid is introduced under a dynamic vacuum.

Step (c) of the method may comprise (c) after or when the lower end of the substrate has been part-filled with the liquid, step-wisely applying a vacuum to the open ends of the channels at the upper end of the substrate while introducing the liquid into the substrate, preferably until a pre-determined amount of the liquid has been introduced into (i.e. applied to the interior of) the substrate. It is preferred that step (c) comprises after or when the lower end of the substrate has been part-filled with the liquid, step-wisely applying a vacuum to the open ends of the channels at the upper end of the substrate while continuously introducing the liquid into the substrate, preferably until a pre-determined amount of the liquid has been introduced into the substrate.

In the step-wise application of a vacuum, the method may comprise the steps (c1) pausing or stopping the introduction of the liquid (e.g. by pushing or injecting the liquid) into the substrate and then applying a vacuum to the open ends of the channels at an upper end of the substrate; and (c2) pausing or stopping the application of a vacuum to the open ends of the channels at an upper end of the substrate and then introducing the liquid into the substrate (e.g. by pushing or injecting the liquid) through open ends of the channels at the lower end of the substrate, optionally (c3) repeating (c1) and (c2), preferably until a pre-determined amount of the liquid has been introduced into (i.e. applied to the interior of) the substrate.

In general, it is preferred that step (c) of the method comprises, after or when the lower end of the substrate has been part-filled with the liquid, continuously applying a vacuum to the open ends of the channels at an upper end of the substrate while introducing the liquid into the substrate, preferably until a pre-determined amount of the liquid has been introduced into the substrate. The vacuum may be continuously applied for 0.25 to 15 seconds, such as 0.5 to 10 seconds, preferably 1 to 7.5 seconds (e.g. 2 to 5 seconds).

The method typically comprises the steps of (b2") introducing the liquid into the substrate through the open ends of the channels, preferably until a pre-determined amount of the liquid has been introduced into the substrate, and (c) after or when the lower end of the substrate has been part-filled with the liquid in (b2'), continuously applying a vacuum to the open ends of the channels at the upper end of the substrate while introducing (i.e. simultaneously introducing) the liquid into the substrate in (b2"). Thus, during step (b2") the substrate is continually subjected to a vacuum.

Typically, the means for applying a vacuum comprises a funnel (e.g. a flow cone). The funnel generally has a wider end for receiving an upper end of the substrate.

Normally, the means for applying a vacuum forms a sealing engagement with the upper end of the substrate. The means for applying a vacuum may further comprise a seal for forming a sealing engagement with the upper end of the substrate. It is preferred that the seal for forming a sealing engagement with the upper end of the substrate comprises, or consists of, an inflatable collar (e.g. the second inflatable collar).

Typically, the inflatable collar is on an internal surface of the wider end of the funnel. The inflatable collar provides a seal for the vacuum at the upper end of the substrate and can be used to hold the substrate when it is to be lifted away from the means for holding the substrate vertically toward the end of the method.

The method of the invention may comprise the step (d) forming a sealing engagement between an upper end of the substrate and the means for applying a vacuum. It is preferred that step (d) comprises forming a sealing engagement between an upper end of the substrate and the means for applying a vacuum by inflating an inflatable collar (e.g. the second inflatable collar) around the upper end of the substrate.

Step (d) typically occurs before any steps involving the application of a vacuum, such as steps (c), (c1) or (b2").

In general, step (d) is after step (a2). Preferably step (d) is after step (a3), more preferably step (d) is after step (a4). It is particularly preferable that step (d) is after step (b2').

The means for applying a vacuum may further comprise a valve. The valve is preferably a relief valve. The relief valve is for venting the gas displaced by the introduction of the liquid into the substrate and is particularly advantageous when the means for applying a vacuum has formed a sealing engagement with an upper end of the substrate before any introduction of the liquid into the substrate through the lower end.

The means for applying a vacuum may comprise a vacuum generator, such as a vacuum pump. The vacuum generator can be connected to the funnel by a conduit.

After a pre-determined amount or a single dose of the liquid has been introduced into the substrate, the liquid is typically retained within the interior of the substrate.

The method of the invention may comprise a step (e) retaining the liquid introduced into the substrate, such as retaining substantially all of the liquid introduced into the substrate.

It is preferred that step (e) comprises retaining the liquid introduced into the substrate, particularly substantially all of the liquid, with the means for applying a vacuum. More preferably step (e) comprises retaining the liquid introduced into the substrate, particularly substantially all of the liquid, by applying a vacuum. The vacuum may be continuously applied for 0.25 to 15 seconds, such as 0.5 to 10 seconds, preferably 1 to 7.5 seconds (e.g. 2 to 5 seconds).

The substrate may still be under a vacuum after all of the liquid (e.g. the pre-determined amount or single dose) has been introduced into the substrate. The vacuum may assist in retaining the liquid within the substrate. A vacuum may be applied after all of the liquid has been introduced into the substrate to further assist in retaining the liquid therein. During application of the vacuum, the piston may abut the lower end of the substrate (i.e. be in contact with the substrate) or the piston may be retracted slightly. When the piston is in contact with or near to the lower end of the substrate, the application of the vacuum may also provide the advantage of cleaning the piston face for the next substrate.

Typically, step (e) occurs after steps involving the introduction of all of the liquid under vacuum, such as steps (b2"), (c2) or (c3). When a pre-determined amount of the liquid is introduced into the substrate, then step (e) comprises (e) retaining the pre-determined amount, preferably all or substantially all of the pre-determined amount, of the liquid introduced into the substrate.

The vacuum that is applied to the substrate in step (c), step (c1) and/or step (e) is generally from 0.5 inches of water to 20 inches of water, preferably 2.5 inches of water to 17.5 inches of water, such as 5 inches of water to 15 inches of water.

In general the method comprises the step (f) removing the substrate from the housing. There are many ways of removing the substrate from the housing. Typically, step (f) comprises (f1) deflating the inflatable collar (i.e. the first inflatable collar) around the lower end of the substrate.

Step (f) may comprise (f1) deflating the inflatable collar (i.e. the first inflatable collar) around the lower end of the substrate, and (f2) removing the substrate from the housing with the means for applying the vacuum. More preferably, the step (f2) comprises lifting the substrate out of the housing, preferably with the means for applying the vacuum.

Additionally or alternatively, step (f) may comprise (f1a) retracting the piston to the first position, and then (f1) deflating the inflatable collar (i.e. the first inflatable collar) around the lower end of the substrate.

The means for introducing the liquid into the substrate may be moveable, such as moveable independently of the means for holding the substrate vertically. The means for introducing the liquid into the substrate may form a liquid tight seal with the means for holding the substrate vertically. For example, the reciprocating piston within a housing may be moveable independently of the inflatable collar (i.e. the first inflatable collar) for the lower end of the substrate. When the substrate is held vertically (e.g. by the means for holding the substrate vertically), then the means for introducing the liquid into the substrate may be moved into a position for introducing the liquid into the substrate and, typically, forms a liquid tight seal with the means for holding the substrate vertically. After the liquid has been introduced into the substrate, the reciprocating piston and housing may be moved away from the substrate. In this embodiment, step (f) of the method may comprise removing the substrate from the housing by moving the housing away from the substrate, such as by lowering the substrate away from the lower end of the substrate.

Step (f), step (f1a) or step (f1) is performed after steps involving the introduction of all of the liquid under vacuum, such as steps (c), (b2"), (c2) or (c3).

Step (f2) is performed after steps involving the introduction of all of the liquid under vacuum, such as steps (c), (b2"), (c2) or (c3). When step (e) is present in the method, then step (f2) may occur before, after or concurrently with step (e), preferably step (f2) occurs after step (e).

After the liquid has been introduced into the substrate, the substrate may be dried and/or calcined. The method of the invention may comprise the step of (g) drying and/or calcining the substrate containing the liquid. Step (g) is performed after all of the above steps. Suitable drying and calcination conditions depend on the composition of the liquid and the type of substrate. Such conditions are known within the art.

The method of the invention preferably comprises:
(A) dispensing a pre-determined amount of the liquid into a delivery chamber;
(1) inserting the substrate into a housing for receiving a lower end of the substrate; then
(2) holding the substrate vertically by inflating a first inflatable collar around the lower end of the substrate;
(B) forming a sealing engagement between an upper end of the substrate and a means for applying a vacuum by inflating a second inflatable collar around the upper end of the substrate;
(3) introducing the liquid into the substrate by pushing the liquid from the delivery chamber through the open ends of the channels at the lower end of the substrate with a piston; then
(4) when the lower end of the substrate has been part-filled with the liquid, applying a vacuum to the open ends of the channels at the upper end of the substrate with the means for applying a vacuum while introducing the liquid into the substrate by pushing the liquid from the delivery chamber through the open ends of the channels at the lower end of the substrate with the piston until the pre-determined amount of the liquid has been introduced into the substrate;
(5) deflating the first inflatable collar around the lower end of the substrate; then
(6) removing the substrate containing the liquid from the housing and then, preferably, deflating the second inflatable collar; and then
(7) drying and/or calcining the substrate containing the liquid; and
wherein step (A) is performed before step (3) and before, after or concurrently
with step (1) and/or step (2), and step (B) is performed before step (4) and preferably step (B) is performed before step (3).

The method and apparatus of the invention can be used to manufacture "zoned" or "layered" catalysts or coated substrates.

After drying and/or calcining a coated substrate, the method can be repeated, typically to coat a honeycomb monolith substrate with a second liquid comprising a catalyst component. After a first pass, the same substrate can be coated in a second pass with a different liquid. The second liquid typically has a different composition to the first liquid that was applied to or introduced into the substrate.

The second liquid can be introduced into the substrate from the same end as the first liquid. Alternatively, the second liquid can be introduced into the substrate from the opposite end to the first liquid. Such a method is particularly useful for coating a filtering honeycomb monolith substrate, such as a wall-flow honeycomb monolith substrate.

The method may further comprise the step of (h) inverting the substrate containing the first liquid, and then repeating the method as described above, such as repeating steps (a) to (c), steps (a) to (d), steps (a) to (e), steps (a) to (f2), steps (a) to (g) or steps (1) to (7), (A) and (B), with a second liquid comprising a catalyst component. It is preferred that step (g) of drying and/or calcining the substrate containing the liquid is performed before step (h).

The apparatus of the invention may or may not comprise means for inverting the substrate (e.g. means for inverting the substrate containing the first liquid).

The step of inverting the substrate is a step of rotating the substrate through 180°. After inverting the substrate, the open ends of the channels that were originally at a lower end of the substrate will be at an upper end of the substrate. The second liquid will be introduced into the open ends of the channels at a lower end of the substrate, which were at an upper end of the substrate prior to inversion.

Substrates for emissions control devices are well known in the art and generally any such substrate may be used in the method or with the apparatus of the invention.

The substrate may be a partial filter substrate (see, for example, the partial filter substrates disclosed in WO 01/80978 or EP 1057519). Typically, a partial filter substrate has a collecting element (e.g. for particulate matter, such as soot particles) and a plurality of channels (i.e. for exhaust gas to flow through), wherein each channel has at least one open end (preferably each channel has two open ends (i.e. each channel has both ends open)). In general, the partial filter substrate has a plurality of walls that define the boundaries of the channels. Typically, the collecting element is a plurality of deflections in the plurality of walls. Each wall may have no deflections or one or more deflections. Each deflection acts as an obstruction to any particulate matter in the exhaust gas that flows through the substrate. Each deflection may have a flap or a wing-like shape and, typically, each deflection projects outwards from (e.g. at an angle to) the plane of the wall. It is preferred that each deflection is combined with an opening in a wall of the substrate. Each opening in a wall allows the exhaust gas to flow from one channel to a neighbouring channel.

In general, it is preferred that the substrate is a honeycomb monolith substrate. The term "honeycomb monolith substrate" as used herein refers to a substrate having a plurality of channels that extend longitudinally along the length of the substrate, wherein each channel has at least one open end (i.e. for exhaust gas to flow through). Typically, the channels are formed between a plurality of walls. The channels may have an irregular cross-section and/or a regular cross-section. When the channels have a regular cross-section, then the cross-section is not limited to a hexagonal cross-section and can, for example, be rectangular or square.

The honeycomb monolith substrate may be a flow-through honeycomb monolith substrate. Thus, the honeycomb monolith substrate may comprise a plurality of channels, typically extending therethrough, wherein each channel is open at both ends (i.e. an open end at the inlet and an open end at the outlet). In general, a flow-through honeycomb monolith substrate is different to a partial filter honeycomb monolith substrate. A flow-through honeycomb monolith substrate typically does not comprise a collecting element, such as a plurality of deflections in the plurality of the walls.

The honeycomb monolith substrate may be a filtering honeycomb monolith substrate, such as a wall-flow honeycomb monolith substrate. Such filtering honeycomb monolith substrates are able to trap or remove particulate matter (PM), such as soot particles, in an exhaust gas produced by an internal combustion engine, particularly a compression ignition engine (e.g. a diesel engine).

In a wall-flow honeycomb monolith substrate, the honeycomb monolith substrate may comprise a plurality of channels, wherein each channel has an open end and a closed end (e.g. blocked end). Each channel is typically separated from a neighbouring channel by a porous structure (e.g. a porous wall). Generally, each channel having an open end at a first end of the substrate and a closed (e.g. blocked) end at a second (i.e. opposite) end of the substrate is typically adjacent to a channel having a closed (e.g. blocked) end at the first end of the substrate and an open end at the second (i.e. opposite) end of the substrate. When the first end of the substrate is arranged to be an upstream end, then (i) each channel having an open end at the first end of the substrate and a closed end at the second end of the substrate is an inlet channel, and (ii) each channel having an closed end at the first end of the substrate and an open end at the second end of the substrate is an outlet channel. It is preferred that each inlet channel is alternately separated from an outlet channel by the porous structure (e.g. a porous wall) and vice versa. Thus, an outlet channel is vertically and laterally adjacent to an inlet channel and vice-versa. Fluid communication between the inlet channels and the outlet channels is via the porous structure (e.g. porous wall) of the substrate. When viewed from either end, the alternately closed (e.g. blocked) and open ends of the channels take on the appearance of a chessboard.

Generally, the substrate is a ceramic material or a metallic material. When the substrate is a ceramic material, then typically the ceramic material may be selected from the group consisting of silicon carbide (SiC), aluminium nitride, silicon nitride, aluminium titanate, alumina, cordierite ($SiO_2$—$Al_2O_3$—MgO), mullite, pollucite and a thermet (e.g. $Al_2O_3$/Fe, $Al_2O_3$/Ni or $B_4C$/Fe, or composites comprising segments of any two or more thereof). When the substrate is a metallic material, then typically the metallic material is selected from the group consisting of Fe—Cr—Al alloy, Ni—Cr—Al alloy and a stainless steel alloy.

DEFINITIONS

The term "substantially vertically" used herein with reference to holding the substrate or to the means for holding the substrate refers to an arrangement where the central axis of the substrate is ±5° from the vertical, preferably ±3° from the vertical, such as ±0° from the vertical (i.e. perfectly vertical within measurement error).

The term "pre-determined amount" as used herein refers to a total amount of the liquid for introduction into the substrate that is sufficient to obtain a specific product characteristic, such as a desired coating specification. The amount is "pre-determined" in the sense that it is determined off-line in routine experiments to find out the total amount of the liquid that is needed to achieve the desired product characteristics. Such pre-determined amounts can readily be determined and may be known from using other methods or apparatus for coating substrates in the art (e.g. see WO 99/47260 and WO 2011/080525).

The term "single dose" as used herein refers to an amount of the liquid for coating a single substrate, typically to meet a desired product specification.

The term "part-fill time period" as used herein refers to the period of time from initially (i.e. the start of) introducing the liquid into the substrate (e.g. through the open ends of the channels at the lower end of the substrate) until the lower end of the substrate has been part-filled with the liquid. As the method of the invention can be performed repeatedly, typically using automated apparatus, it is possible to determine a "part-fill time period" because the time taken to perform each step of the method, particularly for part-filling a lower end of the substrate with the liquid, is substantially the same in each cycle of the method for a specific type of substrate and liquid formulation.

Any reference to a "vacuum" as used herein refers to a pressure that is below atmospheric pressure. The term "vacuum" is not to be interpreted in its literal sense of a space that is completely devoid of matter. The strength of the vacuum that is applied to the substrate will depend on the composition of the liquid and the type of substrate that is being used. The vacuum should be strong enough to clear the cells of the substrate so that there are no blockages. Such vacuum strengths or reduced pressures are well known in the art.

The term "substantially all" as used herein with reference to the amount of liquid in the delivery chamber that is introduced into the substrate or step (e), which involves retaining the liquid introduced into the substrate, refers to 99% or more (e.g. 99.5% or more) of the liquid by volume or by weight, preferably by volume.

EXAMPLES

The invention will now be illustrated by the following non-limiting examples.

Example 1

Washcoat Preparation and Substrate

A conventional three-way catalyst washcoat was prepared for coating monolithic flow-through substrates. The viscosity of the washcoat was measured at 17° C. using a "Brookfield RV DVII+Extra Pro" viscometer with a SC4-27 spindle. The 1 rpm shear viscosity was approximately 26500 cP and the 50 rpm shear viscosity was 1500 cP.

A flow-through cordierite monolithic substrate having a height of 3.09", a diameter of 4.16" and 900 cells per cubic inch was coated. It was desired to coat a length of 55% of the axial length of the substrate. Set-up coating trials had shown that 163.3 g of washcoat would deliver the desired amount of washcoat and PGM onto the part. The mass of 163.3 g was a pre-determined amount (i.e. mass).

Coating Process

A pre-determined amount of washcoat was dispensed into the coating rig for subsequent monolith coating using a volumetric piston delivery system. The pre-determined amount of washcoat was a pre-determined volume of the washcoat, which was accurately dispensed into the coating rig using a volumetric doser. The pre-determined volume was calculated from a measurement of the density of the washcoat and the pre-determined mass. The pre-determined volume was the same for each of the 25 substrates that were coated in this example.

The coating apparatus that was used is shown in FIG. 1. In FIG. 1, the piston face and delivery chamber diameter each have a diameter that closely conform to the diameter of the substrate that is to be coated. When the lower seal bladder is inflated around the substrate it is gripped and due to the size of the diameter of the delivery chamber the seal there are no air gaps.

At the start of the process, the piston was in a raised position and the substrate was loaded on top of the piston face, which was made of a PET-P polymer. The lower seal bladder was then inflated to hold the substrate in place and the piston was lowered to a depth of 60 mm below the substrate. The pre-determined mass of 163.3 g of washcoat was then injected from the volumetric doser (not shown in FIG. 1) through the fluid feed (e.g. a side dosing port) into the delivery chamber and onto the piston face. The flow cone was lowered onto the top of the substrate (as shown in FIG. 1) and the upper seal bladder was inflated around the substrate. The piston face was then raised using the lift mechanism to push the washcoat toward the substrate. The piston face was accelerated at 50 mm $s^{-2}$ until it reached a speed of 40 mm $s^{-1}$. The piston face eventually reached its starting position where it touched the substrate and was then raised a further 2 mm above this position to inject the washcoat into the substrate.

As the piston was raised, a first vacuum was triggered when 90% of the washcoat had been injected into the substrate. The vacuum was set at 13" H₂O and was applied for 3 seconds. The lower seal bladder was then deflated and the substrate was raised 50 mm using the flow cone. This broke the seal between the substrate and the piston face. As the substrate was raised, a second vacuum was applied. The vacuum was set at 14" H₂O and was applied for 3 seconds. There was no gap between the first and second vacuums. The upper seal bladder was then deflated and the substrate was then safely released ensuring that no damage occurred. The coating depth was measured using X-ray analysis. The substrate was then dried by forcing hot air through its channels. The substrate was then inverted and the opposite side of the substrate was coated using the same method described above. Twenty five substrates were coated in this way and the capability of the rig was calculated using statistical analysis.

Results

The lengths of the coatings that were first applied to the substrates were measured and the analysis is shown in Table 1 below.

TABLE 1

| | |
|---|---|
| Average Dose Length (mm) | 44.15 |
| Average % Dose Length (%) | 56.3 |
| Dose Length StDev (mm) | 0.24 |
| Max Dose Length (mm) | 44.58 |
| Min Dose Length (mm) | 43.95 |
| Dose Length Max Range (mm) | 0.63 |
| Average Spread (mm) | 2.51 |
| Spread StDev (mm) | 0.78 |
| Max Spread (mm) | 4.08 |

The average length of the first washcoat was found to be 44.15 mm of the 78.49 mm (3.09") total axial length of the substrate. This is equivalent to 56.3% of the axial length. The minimum coating length was 56.0% of the axial length and the maximum coating length was 56.8% of the axial length over the coating trial. The lengths of the second coatings that were applied to the substrates were measured and the analysis is shown in Table 2 below. A coating length of 55% was selected for both the first and second coatings to ensure that a complete axial length of the substrate was coated (there should be a central overlap region occupying around 10% of the axial length of the substrate).

As described in the coating process, for all 25 parts that were given an initial coating of 56.3% along the axial length, these were then inverted and coated in the equipment again so that the parts could be coated around 56.3% from the opposite side. From the X-ray analysis, the coating "flatness" (e.g. the difference between the highest and lowest points of the coating profile) was estimated as being between 2 to 3 mm.

TABLE 2

| | |
|---|---|
| Average Dose Length (mm) | 44.35 |
| Average % Dose Length (%) | 56.5 |
| Dose Length StDev (mm) | 0.70 |
| Max Dose Length (mm) | 45.56 |
| Min Dose Length (mm) | 43.23 |
| Dose Length Max Range (mm) | 2.33 |
| Average Spread (mm) | 3.72 |
| Spread StDev (mm) | 0.69 |
| Max Spread (mm) | 4.66 |

Example 2

Washcoat Preparation and Substrate

A conventional three-way catalyst washcoat was prepared for coating monolithic flow-through substrates. The viscosity of the washcoat was measured at 17° C. using a "Brookfield RV DVII+Extra Pro" viscometer with a SC4-27 spindle. The 1 rpm shear viscosity was approximately 6500 cP and the 50 rpm shear viscosity was 285 cP.

A flow-through cordierite monolithic substrate having a height of 4.29", a diameter of 4.16" and 900 cells per cubic inch was coated. It was desired to coat a length of 50% of the axial length of the substrate. Set-up coating trials had shown that 190.0 g of washcoat would deliver the desired amount of washcoat and PGM onto the part. The mass of 190.0 g was a pre-determined amount (i.e. mass).

Coating Process

A pre-determined volume of washcoat was manually delivered to the apparatus (e.g. by hand) by pausing the normally automated sequence at the appropriate time, as explained below. The coating apparatus that was used is shown in FIG. 1.

At the start of the process, the piston was in a raised position and the substrate was loaded on top of the piston face, which was made of a PET-P polymer. The lower seal bladder was then inflated to hold the substrate in place and the piston was lowered to a depth of 60 mm below the substrate. The flow cone was lowered onto the top of the substrate (as shown in FIG. 1) and the upper seal bladder was inflated around the substrate. The upper bladder was inflated, and the lower bladder deflated. The flow cone was then raised, removing the part from the lowered piston. The pre-determined mass of 190 g of washcoat was then added directly to the piston face. The flow cone was then lowered to the down position, and the lower bladder re-inflated. The piston face was then raised using the lift mechanism to push the washcoat toward the substrate. The piston face was accelerated at 50 mm s$^{-2}$ until it reached a speed of 40 mm s$^{-1}$. The piston face eventually reached its starting position where it touched the substrate and was then raised a further 2 mm above this position ensure 100% contact of the part and the piston face.

As the piston was raised, a first vacuum was triggered when 90% of the washcoat had been injected into the substrate. The vacuum was set at 10" H₂O and was applied for 1 second. The lower seal bladder was then deflated and the substrate was raised 50 mm using the flow cone. This broke the seal between the substrate and the piston face. As the substrate was raised, a second vacuum was applied. The vacuum was set at 10" H₂O and was applied for 4 seconds. There was no gap between the first and second vacuums. The upper seal bladder was then deflated and the substrate was then safely released ensuring that no damage occurred. The coating depth was measured using X-ray analysis.

Results

The length of the first washcoat was found to be 55.14 mm of the 108.97 mm (4.29") total axial length of the substrate. This is equivalent to 50.6% of the axial length. From the X-ray analysis, the coating "flatness" was estimated as being between 2 to 3 mm.

Example 3

Washcoat Preparation and Substrate

A conventional washcoat formulation for selective catalytic reduction (SCR) comprising a Cu zeolite was prepared. It was desired to coat a length of 60% of the axial length of a wall-flow filter with washcoat formulation.

Coating Processes

A wall-flow filter was coated with the washcoat formulation using the coating process of Example 1 (in accordance with the invention). The vacuum was triggered 0.5 seconds before introduction of the washcoat formulation through the lower end of the filter was complete (i.e. when the piston face touches the lower face of the filter).

As a comparison, the method was repeated using the same type of wall-flow filter and the same washcoat formulation. Instead of triggering the vacuum 0.5 seconds before the complete introduction of the washcoat formulation through the lower end of the filter, the vacuum was triggered 2 seconds after the introduction of the washcoat formulation through the lower end of the filter was complete (i.e. when the piston face touched the lower face of the filter).

Results

Figure 2:
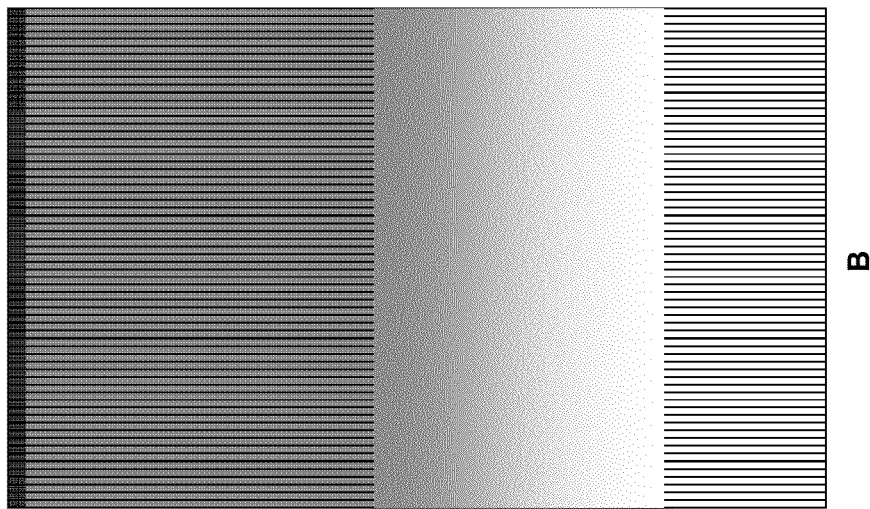
FIG. 2 contains (A) an X-ray image and (B) a drawing of a wall-flow filter substrate that has been coated using a method in accordance with the invention.
Figure 2:
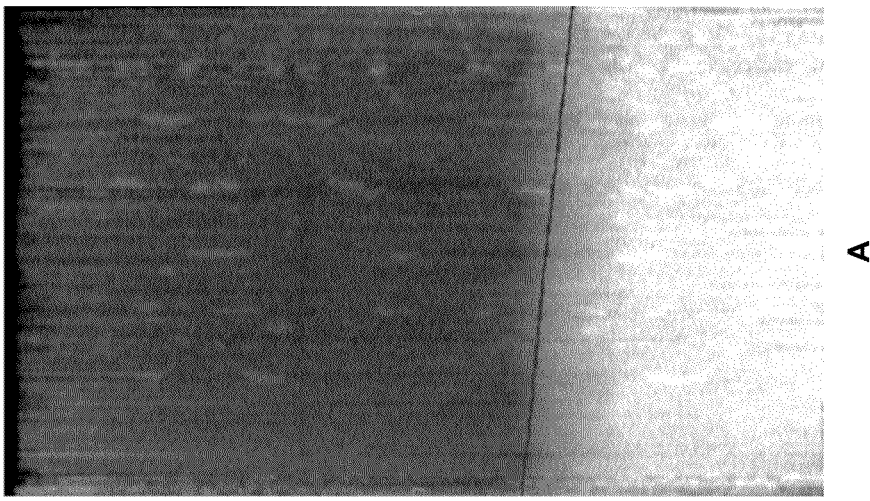

FIG. 2 shows the distribution of the washcoat formulation through the wall-flow filter after it has been applied using a method in accordance with the invention (e.g. the vacuum was applied whilst the liquid was still being introduced through the lower end of the substrate). The X-ray image shown in A of FIG. 2 (see also the representative illustration in B of FIG. 2) demonstrates that the washcoat formulation was uniformly distributed along the lengths of the channels.

Figure 3:
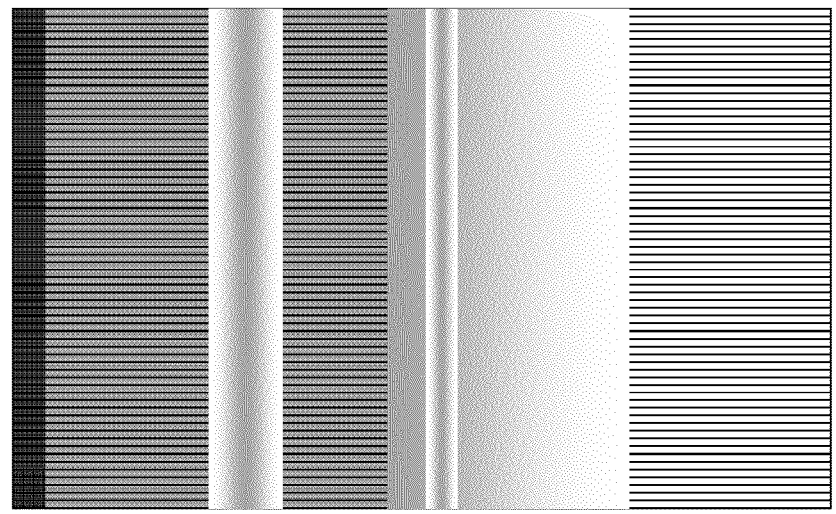
FIG. 3 contains (A) an X-ray image and (B) a drawing of a wall-flow filter substrate that has been coated using a method where (i) liquid has been introduced into the lower end of the substrate and (ii) after introduction of the liquid there is a short pause before applying a vacuum to the upper end of the substrate.
Figure 3:
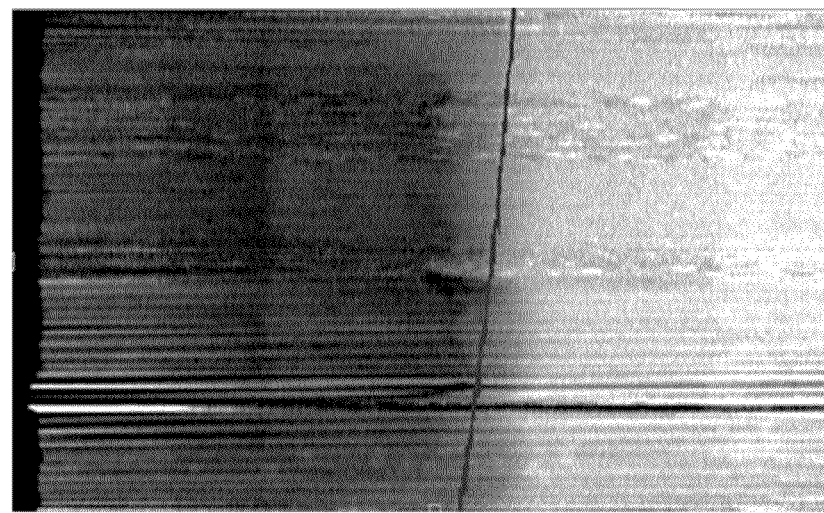

FIG. 3 shows the distribution of the washcoat formulation through the wall-flow filter after it has been applied using a comparative method (e.g. the vacuum was applied after the liquid had been completely introduced through the lower end of the substrate). This method resulted in the formation of "bands" (e.g. a non-uniform distribution of the washcoat formulation along the lengths of the channels). See the X-ray image shown in A and the representative illustration shown in B of FIG. 3.

For the avoidance of any doubt, the entire content of any and all documents cited herein is incorporated by reference into the present application.

The invention claimed is:

1. A method of coating a substrate with a liquid comprising a catalyst component, the method comprising:
   (a) holding the substrate vertically, thereby defining upper and lower ends thereof, wherein the vertical substrate comprises a plurality of channels that are open at said upper and lower ends;
   (b) continuously introducing the liquid into the substrate by pushing or injecting the liquid through the open ends of the channels at the lower end of the substrate with a piston; and
   (c) after the lower end of the substrate has been partly filled with the liquid in step (b), applying a vacuum to the open ends of the channels at the upper end of the substrate while continuing to introduce the liquid into the substrate.

2. The method according to claim 1, step (b) further comprising: introducing the liquid in a pre-determined amount.

3. The method according to claim 1, wherein in step (b), said pushing or injecting is performed with a reciprocating piston, where the reciprocating piston pushes or injects the liquid into the substrate as the piston moves from a first position, where the piston is retracted, to a second position, where the piston abuts the lower end of the substrate.

4. The method according to claim 3, wherein the reciprocating piston is within a housing and, in the first position, the retracted piston within the housing defines a delivery chamber having a displacement volume.

5. The method according to claim 4, further comprising dispensing a pre-determined amount of the liquid into the delivery chamber when the piston is in the first position.

6. The method according to claim 5, wherein substantially all of the liquid in the delivery chamber is introduced into the substrate when the reciprocating piston moves from the first position to the second position.

7. The method according to claim 1, wherein the piston has a piston face comprising a polyester polymer.

8. The method according to claim 1, step (a) further comprising: holding the substrate vertically by inflating an inflatable collar around the lower end of the substrate.

9. The method according to claim 8, wherein the inflatable collar has a square or rectangular cross-section.

10. The method according to claim 1, step (c) further comprising: after a lower end of the substrate has been partly filled with the liquid, applying the vacuum with a vacuum generator while continuing to introduce the liquid into the substrate.

11. The method according to claim 10, wherein the method further comprises:
   prior to step (b) and step (c), forming a sealing engagement between the upper end of the substrate and the vacuum generator by inflating an inflatable collar around the upper end of the substrate.

12. The method according to claim 1, further comprising:
   (d) drying and/or calcining the substrate containing the liquid.

13. The method according to claim 12, further comprising:
   (e) inverting the substrate containing the liquid; and
   (f) repeating steps (a) to (c) or (a) to (d) with a second liquid comprising a catalyst component.

14. The method according to claim 1, wherein the vacuum is not applied to the open ends of the channels at the upper end of the substrate until the lower end of the substrate is partly filled with the liquid.

* * * * *